United States Patent

Pedemonte et al.

[11] Patent Number: 6,051,037
[45] Date of Patent: Apr. 18, 2000

[54] DYE MIXTURES OF FIBER-REACTIVE AZO DYES AND USE THEREOF FOR DYEING MATERIAL CONTAINING HYDROXY- AND/OR CARBOXAMIDO GROUPS

[75] Inventors: Ron Pedemonte, Eppstein-Vockenhausen; Werner Russ, Florsheim; Christian Schumacher, Kelkheim, all of Germany

[73] Assignee: Dystar Textil Farben GmbH & Co. Deutschland KG, Germany

[21] Appl. No.: 09/296,062

[22] Filed: Apr. 21, 1999

[51] Int. Cl.⁷ .......................... D06P 1/382; D06P 1/384; D06P 3/66; C09B 67/24
[52] U.S. Cl. .......................... 8/549; 8/641; 8/918; 8/924
[58] Field of Search ................................. 8/549, 638, 641

[56] References Cited

U.S. PATENT DOCUMENTS

| | | | |
|---|---|---|---|
| 4,341,699 | 7/1982 | Tezuka et al. | 260/153 |
| 4,725,675 | 2/1988 | Meininger et al. | 558/548 |
| 5,349,057 | 9/1994 | Büch et al. | 534/637 |
| 5,931,976 | 8/1999 | Pedemonte et al. | |

FOREIGN PATENT DOCUMENTS 899376  6/1962  United Kingdom .

*Primary Examiner*—Margaret Einsmann
*Attorney, Agent, or Firm*—Connolly Bove Lodge & Hutz LLP

[57] ABSTRACT

The present invention concerns dye mixtures of fiber-reactive azo dyes, suitable for dyeing hydroxy- and/or carboxamido-containing material, such as cellulose fibers, like cotton, or wool and nylon, bright orange to red shades. The mixtures of the invention comprise one or more monoazo dyestuffs corresponding to the general formula (1) and one or more monoazo dyestuffs corresponding to the formula (2) wherein the general formulae (1) and (2) are defined as given in claim 1, a method for their preparation and a process for dyeing hydroxy- and/or carboxamido containing fiber material in which a inventive dye is applied to the material.

15 Claims, No Drawings

DYE MIXTURES OF FIBER-REACTIVE AZO DYES AND USE THEREOF FOR DYEING MATERIAL CONTAINING HYDROXY- AND/OR CARBOXAMIDO GROUPS

The present invention relates to the field of fiber-reactive azo dyes. With the present invention dye mixtures of fiber-reactive azo dyes suitable for dyeing hydroxy- and/or carboxamido-containing material in bright orange to red shades with a very high tinctorial strength and excellent fastness properties have unexpectedly been found, which comprise one or more, such as two or three, monoazo dyestuffs corresponding to the general formula (1)

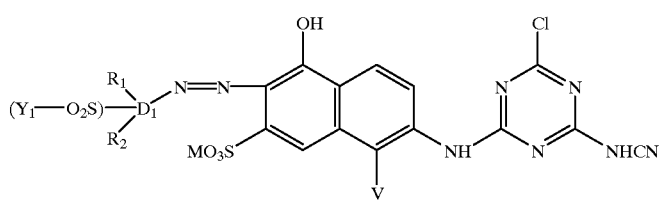

(1)

and one or more, such as two or three, monoazo dyestuffs corresponding to the formula (2)

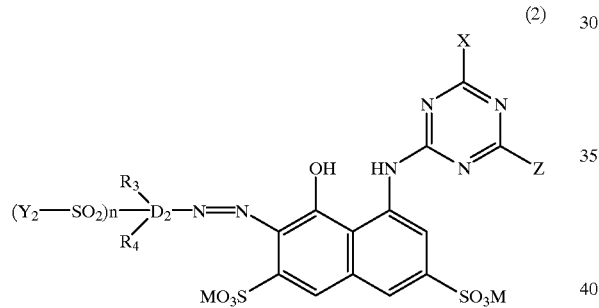

(2)

in which $D_1$ is the radical of a benzene or naphthalene nucleus, the azo group preferably being bonded in the 2-position in the case of the naphthalene nucleus;

$D_2$ has one of the meanings of $D_1$;

$R_1$ and $R_2$ are independently of one another hydrogen, methyl, ethyl, methoxy, ethoxy, sulfo or carboxy, if $D_1$ is a benzene radical, preferably methyl, methoxy or hydrogen and in particular preferably hydrogen, and is, if $D_1$ a naphthalene radical, hydrogen, sulfo or carboxy, preferably hydrogen or sulfo;

$R_3$ and $R_4$ are independently of one another hydrogen, methyl, ethyl, methoxy, ethoxy, sulfo or carboxy, if $D_2$ is a benzene radical, preferably methyl, methoxy or hydrogen and in particular preferably hydrogen, and is, if $D_2$ a naphthalene radical, hydrogen, sulfo or carboxy, preferably hydrogen or sulfo;

$Y_1$ is vinyl or is ethyl which is substituted in the β-position by a substituent which is eliminated by the action of an alkali, forming the vinyl group, such as chlorine, thiosulfato, sulfato, alkanoyloxy of 2 to 5 carbon atoms, such as acetyloxy, phosphate, sulfobenzoyloxy and p-toluylsulfonyloxy, and $Y_1$ is preferably vinyl, β-chloroethyl, β-thiosulfatoethyl or β-sulfatoethyl and is in particular preferably vinyl or β-sulfatoethyl;

$Y_2$ has one of the meanings of $Y_1$; the groups —$SO_2$—$Y_1$ and —$SO_2$—$Y_2$ are preferably bonded to the benzene ring, if $D_1$ or $D_2$ are a benzene radical, in meta- or preferably para-position relative to the azo group.

M is hydrogen or an alkali metal, such as lithium, sodium and potassium;

n is the number 0 or 1;

V is hydrogen or a sulfo group

X is chloro, fluoro, hydroxy, cyanamide, methoxy, morpholino, N-methyltaurine, taurine, ethanolamino, diethanolamino, or a group of the formulae (3), (4), (5), or (6)

(3)

(4)

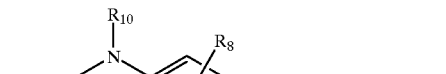

(5)

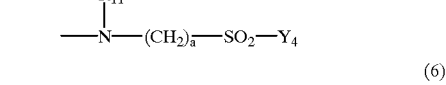

(6)

in which $R_5$, $R_6$, $R_8$, $R_9$ are independently of one another hydrogen, methyl, ethyl, methoxy, ethoxy, sulfo or carboxy, and most preferably methyl, methoxy or hydrogen;

$R_{11}$ is hydrogen, methyl, ethyl or phenyl, which may contain 1 or 2 substituents, such as methyl, ethyl, methoxy, ethoxy, sulfo or carboxy groups, or a group of the formula —$(CH_2)_a$—$SO_2$—$Y_4$, wherein a and $Y_4$ are described below;

$R_{12}$ is hydrogen, methyl, ethyl or phenyl, which may contain 1 or 2 substituents, such as methyl, ethyl, methoxy, ethoxy, sulfo or carboxy groups, or a group of the formula —$(CH_2)_a$—W—$(CH_2)_b$—$SO_2$—$Y_5$, wherein a, b, and $Y_5$ are described below;

$Y_3$, $Y_4$ and $Y_5$ are independently of one another one of the meanings of $Y_1$ a is the number 1, 2, or 3;

b is the number 2 or 3;

W is a group of the formulae —O— or —NH—

Z has one of the meanings of X;

$R_7$ and $R_{10}$ are independently of one another a group of the formula —$(CH_2)_{a'}$—B B is hydrogen, sulfo or carboxy a' is the number 1, 2, 3 or 4;

The formulae mentioned above and in those below the individual formula members, both with different and with the same designation within a formula, can within the scope of their definition have meanings which are the same as or different from one another.

The groups "sulfo", "thiosulfato", "carboxy", "phosphate" and "sulfato" include both the acid form and the salt form of these groups. Accordingly, sulfo groups are groups of the formula —$SO_3M$, thiosulfato groups are groups of the formula —S—$SO_3M$, carboxy groups are groups of the formula —COOM, phosphate groups are groups of the formula —$OPO_3M_2$ and sulfato groups are groups of the formula —$OSO_3M$, in which M is defined as above.

In general, the azo dyestuff or dyestuffs of the formula (1) are contained in the mixture in quantity 5 to 95% by weight, most preferably 30 to 70% and the azo dyestuff or dyestuffs of the formula (2) are contained in the mixture in a mixing ratio of 95 to 5% by weight, most preferably 70 to 30% by weight.

Radicals of the formulae $(Y_2—O_2S)_n—D_2—(R_3,R_4)$— (where n is the number 0) of the azo dyestuffs of the formulae (2) are, for example, 1-sulfo-2-naphthyl, 1,5-disulfo-2-naphthyl, 1-sulfo-2-phenyl, 1,4-disulfo-2-phenyl, 1-sulfo-5-methyl-2-phenyl, 1-sulfo-5-methoxy-2-phenyl, 3-sulfo-2-phenyl, and 4-sulfo-2-phenyl.

Radicals of the formulae $(Y_1—O_2S)_n—D_1—(R_1,R_2)$— and $(Y_2—O_2S)_n—D_2—(R_3,R_4)$— (where n is the number 1) of the azo dyestuffs of the formulae (1) and (2) are, for example, 3-(β-sulfatoethylsulfonyl)-phenyl, 4-(β-sulfatoethylsulfonyl)-phenyl, 2-methyl-5-(β-sulfatoethylsulfonyl)-phenyl, 2-methoxy-5-(β-sulfatoethylsulfonyl)-phenyl, 4-methyl-3-(β-sulfatoethylsulfonyl)-phenyl, 2,5-dimethyl-(β-sulfatoethylsulfonyl)-phenyl, 2,6-dimethyl-4-(β-sulfatoethylsulfonyl)-phenyl, 2-methoxy-4-(β-sulfatoethylsulfonyl)-phenyl, 4-methoxy-5-(β-sulfatoethylsulfonyl)-phenyl, 2,4-dimethoxy-5-(β-sulfatoethylsulfonyl)-phenyl, 2,5-dimethoxy-4-(β-sulfatoethylsulfonyl)-phenyl, 6-(β-sulfatoethylsulfonyl)-1-sulfo-naphthyl-2-yl and 8-(β-sulfatoethylsulfonyl)-6-sulfonaphthyl, and of these in particular 4-(β-sulfatoethylsulfonyl)-phenyl, and derivatives of these radicals in which the β-sulfatoethylsulfonyl group is replaced by the vinylsulfonyl or β-thiosulfatoethysulfonyl or β-chloroethylsulfonyl group.

Preferably, in the formulae (1) and (2), the radicals $D_1$ and $D_2$ are benzene nuclei.

Radicals of the formulae (3) standing for X and/or Z in the azo dyestuffs of the formulae (2) are, for example, 3-(β-sulfatoethylsulfonyl)-phenyl-amino, 4-(β-sulfatoethylsulfonyl)-phenyl-amino, 2-methyl-5-(β-sulfatoethylsulfonyl)-phenyl-amino, 2-methoxy-5-(β-sulfatoethylsulfonyl)-phenyl-amino, 4-methyl-3-(β-sulfatoethylsulfonyl)-phenyl-amino, 2,5-dimethyl-(β-sulfatoethylsulfonyl)-phenyl-amino, 2,6-dimethyl-4-(β-sulfatoethylsulfonyl)-phenyl-amino, 2-methoxy-4-(β-sulfatoethylsulfonyl)-phenyl-amino, 4-methoxy-5-(β-sulfatoethylsulfonyl)-phenyl-amino, 2,4-dimethoxy-5-(β-sulfatoethylsulfonyl)-phenyl-amino, 2,5-dimethoxy-4-(β-sulfatoethylsulfonyl)-phenyl-amino, and of these in particular 4-(β-sulfatoethylsulfonyl)-phenyl-amino, and derivatives of these radicals in which the β-sulfatoethylsulfonyl group is replaced by the vinylsulfonyl or β-thiosulfatoethysulfonyl or β-chloroethylsulfonyl group.

Radicals of the formula (4) standing for X and/or Z in the azo dyestuffs of the formula (2) are, for example, 3-sulfophenylamino, 4-sulfophenylamino, 2-sulfophenylamino, 2-ethylphenylamino, 2-methylphenylamino, N-methylphenylamino, and N-ethylphenylamino. Radicals of the formulae (5) and (6) standing for X and/or Z in the azo dyestuffs of the formula (2) are, for example, γ-(β-sulfatoethylsulfonyl)propylamino, N-phenyl-N-[γ-(β'-sulfatoethylsulfonyl)propyl]amino, β-(β'-chloroethylsulfonyl)ethylamino, N-methyl-β-(β'-sulfatoethylsulfonyl)ethylamino, N-phenyl-N-[β-(β'-sulfatoethylsulfonyl)ethyl]amino, N,N-bis[β-(β'-chloroethylsulfonyl)-ethyl]amino, and N,N-bis[β-(vinylsulfonyl)ethyl]amino.

X is preferably chloro or fluoro and most preferably chloro.

Z is preferably 3-sulfophenyl, 4-(β-sulfatoethylsulfonyl)-phenylamino or N-methyl-β-(β'-sulfatoethylsulfonyl)ethylamino and morpholino and most preferably 3-sulfophenyl.

The dyes according to the general formula (1) are known from the U.S. Pat. No. 5,349,057. The dyes according to the general formulae (2) are known from the U.S. Pat. Nos. 4,725,675 and 4,341,699 and British Pat. No. 899,376.

The novel dye mixtures according to the invention composed from dyes of formula (1) and formula (2) are novel and exhibit a very high tinctorial strength and excellent fastness properties, for example, light- and washfastness.

The dye mixtures of the invention can be prepared in solid or in liquid (dissolved) form. In solid form they generally contain the electrolyte salts customary in the case of water-soluble and in particular fiber-reactive dyes, such as sodium chloride, potassium chloride and sodium sulfate, and also assistants customary in commercial dyes, such as buffer substances capable of establishing a pH in aqueous solution between 3 and 7, such as sodium acetate, sodium borate, sodium bicarbonate, sodium citrate, sodium dihydrogenphosphate and disodiumhydrogenphosphate, small amounts of siccatives or if, they are present in liquid, aqueous solution (including the presence of thickeners of the type customary in print pastes), substances which ensure the permanence of these preparations, for example mold preventatives.

In general, the dye mixtures will take the form of dye powders containing from 10 to 80% by weight, based on the dye powder or preparation, of a strength-standardizing colorless diluent electrolyte salt. These dye powders may in addition contain the abovementioned buffer substances in a total amount of up to 5%, based on the dye powder. If the dye mixtures of the invention are present in aqueous solution, the total dye content of these aqueous solutions is up to about 50% by weight, for example between 5 and 50% by weight, the electrolyte salt content of these aqueous solutions preferably being below 10% by weight, based on the aqueous solution; the aqueous solutions (liquid preparations) can in general contain the abovementioned buffer substances in an amount of up to 5% by weight, preferably up to 2% by weight.

The dye mixtures of this invention can be obtained in a conventional manner, for instance by mechanically mixing the individual dyes in solid form or in form of aqueous solutions in the required proportions or if $D_1$ and $D_2$ are the same, by synthesis, by means of the customary diazotization and coupling reactions using appropriate mixtures of the diazo and coupling components in a manner familiar to those skilled in the art and the necessary proportions. The dye mixtures according to the invention can comprise further fiber-reactive dyestuffs, which serve to shade the dyestuff mixture, in an amount of up to 5% by weight. These "shading dyestuffs" can be added by customary mixing or else, if one or more of the components of the shading dyestuff are identical to the components of the dyestuffs of the formulae (1) and/or (2), can be prepared and introduced into the dyestuff mixture by a chemical route in the same reaction batch together with the synthesis described above for a dye mixture according to this invention. Thus, to prepare a dye mixture according to the invention having a content of shading dyestuff with a particular chromophore, for example, those additional starting compounds which are 3-carboxy- or 3-methyl-5-pyrazolone can be employed in the reaction mixture.

The dye mixtures according to the invention have valuable properties. They are used for dyeing (which includes printing) materials containing hydroxy and/or carboxamide groups, for example in the form of sheet-like structures, such as paper and leather, or of films, such as, for example, of polyamide, or in bulk, such as, for example, polyamide and polyurethane, but in particular these materials in fiber form. The solution of the dye mixtures according to the invention obtained during synthesis of their individual azo dyes can also be used for dyeing directly as a liquid preparation, if appropriate after addition of a buffer substance and if appropriate also after concentration or dilution.

The present invention thus also relates to the use of the dye mixtures according to the invention for dyeing these materials and to processes for dyeing such materials by procedures which are customary per se in which a dye mixture according to the invention is employed as the coloring agent. So, the dye mixtures according to the invention are applied to and fixed on the substrates mentioned, in particular the fiber materials mentioned, by the application techniques known for water-soluble dyestuffs, in particular for fiber-reactive dyestuffs, and they are fixed on these materials in particular by the action of an alkaline reacting agent or by the action of heat or by both measures. The materials are preferably used in the form of fiber materials, in particular in the form of textile fibers, such as woven fabrics or yarns, such as in the form of hanks or wound packages.

Materials containing hydroxy groups are those of naturally occurring or synthetic origin, such as, for example, cellulose fiber materials or regenerated products thereof, and polyvinyl alcohols. Cellulose fiber materials are preferably cotton, but also other plant fibers, such as linen, hemp, jute and ramie fibers; regenerated cellulose fibers are, for example, viscose staple and filament viscose.

Materials containing carboxamide groups are, for example, synthetic and naturally occurring polyamides and polyurethanes, in particular in the form of fibers, for example wool and other animal hair, silk, leather, nylon 6,6, nylon 6, nylon 11, and nylon 4.

Dyeings with very good color yields which are improved with respect to the individual dyestuffs are those obtained with them on cellulose fibers by the exhaustion process for a long liquor ratio using the most diverse acid-binding agents and if appropriate neutral salts, such as sodium chloride or sodium sulfate. Dyeing is preferably carried out in an aqueous bath at temperatures between 40 and 105° C., if appropriate at a temperature of up to 130° C. under pressure, and if appropriate in the presence of customary dyeing auxiliaries. A procedure can be followed here in which the material is introduced into the hot bath, this is gradually heated to the desired dyeing temperature and the dyeing process is brought to completion at this temperature. If desired, the neutral salts which accelerate exhaustion of the dyestuffs can also be added to the bath only after the actual dyeing temperature has been reached.

Very good color yields and a very good color build-up are likewise obtained by the padding process on cellulose fibers, it being possible for the dyeings to be fixed in the customary manner by batching at room temperature or elevated temperature, for example up to about 60° C., by steaming or with dry heat.

Strong prints with a good contour level and a clear white background are likewise obtained by the customary printing processes for cellulose fibers, which can be carried out in one phase, for example by printing with a printing paste comprising sodium bicarbonate or another acid binding agent and subsequent steaming at 100 to 103° C., or in two phases, for example by printing with neutral or weakly acid printing ink and subsequent fixing either by passing the goods through a hot electrolyte-containing alkaline bath or by over-padding with an alkaline electrolyte-containing padding liquor and subsequent batching or steaming or dry heat treatment of the material over-padded under alkaline conditions. The printing result depends only little on the varying fixing conditions.

Hot air at 120 to 200° C. is used for fixing by means of dry heat by the customary thermofixing processes. In addition to customary steam at 101 to 103° C., it is also possible to employ superheated steam and pressurized steam at temperatures of up to 160° C.

The acid-binding agents and the agents which effect fixing of the dyestuffs of the dye mixtures according to the invention to the cellulose fibers are, for example, water-soluble basic salts of the alkali metals and likewise alkaline earth metals with inorganic or organic acids, or compounds which liberate alkali under the influence of heat. The alkali metal hydroxides and alkali metal salts of weak to moderately strong inorganic or organic acids are to be mentioned in particular, the alkali metal compounds preferably meaning sodium and potassium compounds. Such acid-binding agents are, for example, sodium hydroxide, potassium hydroxide, sodium carbonate, sodium bicarbonate, potassium carbonate, sodium formate, sodium dihydrogen phosphate, disodium hydrogen phosphate, sodium trichloroacetate, water-glass or trisodium phosphate.

The dye mixtures according to the invention are distinguished by a high fixing yield when used in dyeing and printing processes on cellulose fiber materials. After customary after-treatment by rinsing to remove non-fixed portions of dyestuff, the dyeings on cellulose show excellent wet-fastnesses, especially since non-fixed portions of dyestuff can easily be washed out because of their good solubility in cold water. The dyeings and prints obtained have clear shades; in particular, the dyeings and prints on cellulose fiber materials have a good lightfastness and very good wet-fastnesses, such as fastness to washing, milling, water, seawater, cross-dyeing and acid and alkaline perspiration, and furthermore a good fastness to pleating, fastness to ironing and fastness to rubbing.

The dye mixtures according to the invention can furthermore also be used for fiber-reactive dyeing of wool. Wool which has been given an antifelting or low-felting treatment (cf., for example, H. Rath, Lehrbuch der Textilchemie (Textbook of Textile Chemistry), Springer-Verlag, 3rd edition (1972), pages 295–299, in particular treatment by the so-called Hercosett process (page 298), J. Soc. Dyers and Colourists 1972, 93–99, and 1975, 33–44) can also be dyed with very good fastness properties.

The process for dyeing wool is carried out here by the customary and known dyeing procedure from an acid medium. Thus, for example, acetic acid and/or ammonium sulfate or acetic acid and ammonium acetate or sodium acetate can be added to the dyebath in order to obtain the desired pH. To achieve a usable levelness of the dyeing, it is advisable to add customary leveling auxiliaries, such as, for example, those based on a reaction product of cyanuric chloride with 3 times the molar amount of an aminobenzensulfonic acid, or based on a reaction product of, for example, stearylamine with ethylene oxide. Thus, for example, the dye mixture according to the invention is preferably first subjected to the exhaustion process from and acid dyebath with a pH of about 3.5 to 5.5, the pH being controlled, and, towards the end of the dyeing time, the pH is shifted into the neutral and, if appropriate, weakly alkaline range up to a pH of 8.5, in order to bring about a complete reactive bond between the dyestuffs of the dye mixtures and the fiber in particular to achieve good depths of color. At the same time, the dyestuff portion which has not been bonded reactively is dissolved off.

The procedure described here also applies to the production of dyeings on fiber materials of other naturally occurring polyamides or of synthetic polyamides and polyurethane. As a rule, the material to be dyed is introduced into the bath at a temperature of about 40° C. and agitated therein for some time, the dyebath is then adjusted to the desired weakly acidic pH, preferably with acetic acid, and the actual dyeing carried out at a temperature between 60 and 98° C. The dyeings can also be carried out at the boiling point or in closed dyeing apparati at temperatures of up to 106° C. Since the water-solubility of the dye mixtures according to the invention is very good, they can also advantageously be employed in customary continuous dyeing processes.

The dye mixtures according to the invention afford clear yellowish-tinged to reddish-tinged orange dyeings on the materials mentioned, preferably fiber materials.

The following Examples serve to illustrate the invention. The parts are parts by weight and the precentage data are precentages by weight, unless stated otherwise. Parts by weight bear the same relation to parts by volume as the kilogram to the liter. The compounds described by their formulae in the Examples are shown in the form of free acids; they are in general prepared and isolated in the form of their salts, in particular alkali metal salts, preferably sodium or potassium salts, and used for dyeing in the form of their salts.

EXAMPLE 1

A dye mixture according to the invention is obtained by mixing in a mechanical mixer 150 parts of an orange electrolyte-salt containing dyestuff of formula (A) in a proportion of 50% with 50 parts of an red electrolyte-salt containing dyestuff of formula (B) in a proportion of 50%. The resulting dye mixture of the invention, when employed by the application and fixing methods customary in the art for fiber-reactive dyes, produces on cellulose fiber materials, for example dyeings and prints in deep reddish-tinged orange shades.

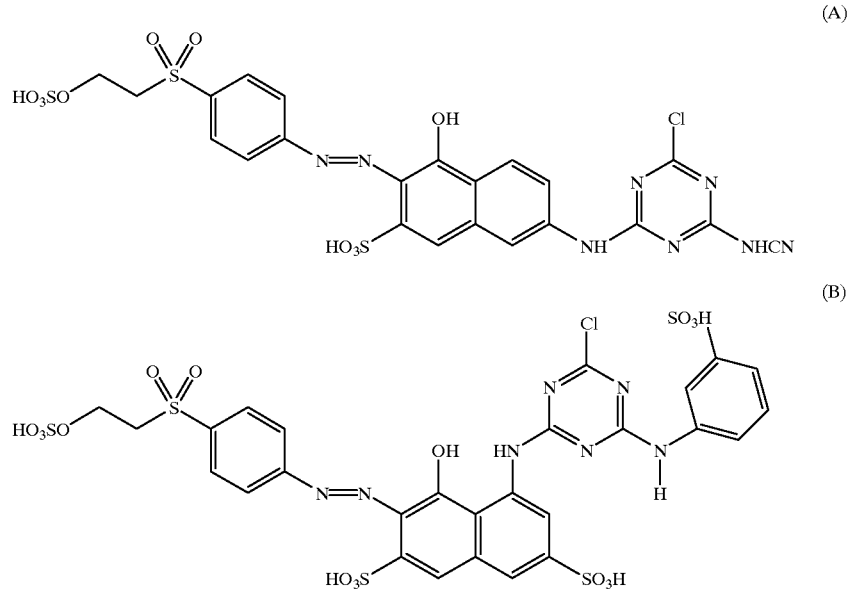

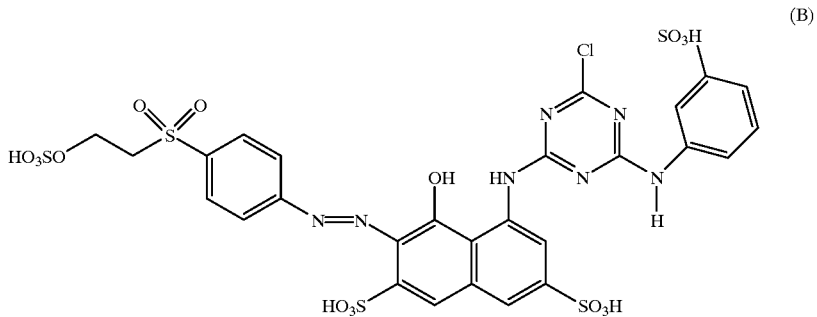

(B)

EXAMPLE 2

A dye mixture according to the invention is obtained by mixing in a mechanical mixer 50 parts of an orange electrolyte-salt containing dyestuff of formula (A) in a proportion of 50% with 150 parts of an red electrolyte-salt containing dyestuff of formula (B) in a proportion of 50%. The resulting dye mixture of the invention, when employed by the application and fixing methods customary in the art for fiber-reactive dyes, produces on cellulose fiber materials, for example dyeings and prints in deep yellowish-tinged red shades. This mixture also exhibits very good dyestuff properties.

EXAMPLE 3

A dye mixture according to the invention is obtained by mixing in a mechanical mixer 50 parts of an orange electrolyte-salt containing dyestuff of formula (C) in a proportion of 50% with 150 parts of an red electrolyte-salt containing dyestuff of formula (B) in a proportion of 50%. The resulting dye mixture of the invention, when employed by the application and fixing methods customary in the art for fiber-reactive dyes, produces on cellulose fiber materials, for example dyeings and prints in deep yellowish-tinged red shades. This mixture also exhibits very good dyestuff properties.

EXAMPLE 4

A dye mixture according to the invention is obtained by mixing in a mechanical mixer 50 parts of an orange electrolyte-salt containing dyestuff of formula (A) in a proportion of 50%, 50 parts of an orange electrolyte-salt containing dyestuff of formula (C) in a proportion of 50% a nd 350 parts of an r ed electrolyte-salt containing dyestuff of formula (B) in a proportion of 50%. The resulting dye mixture of the invention, when employed by the application and fixing methods customary in the art for fiber-reactive dyes, produces on cellulose fiber materials, for example dyeings and prints in deep yellowish-tinged red shades. This mixture also exhibits very good dyestuff properties.

EXAMPLE 5

A dye mixture according to the invention is obtained by mixing in a mechanical mixer 50 parts of an orange electrolyte-salt containing dyestuff of formula (D) in a proportion of 50% with 150 parts of an red electrolyte-salt containing dyestuff of formula (B) in a proportion of 50%. The resulting dye mixture of the invention, when employed by the application and fixing methods customary in the art for fiber-reactive dyes, produces on cellulose fiber materials, for example dyeings and prints in deep yellowish-tinged red shades. This mixture also exhibits very good dyestuff properties.

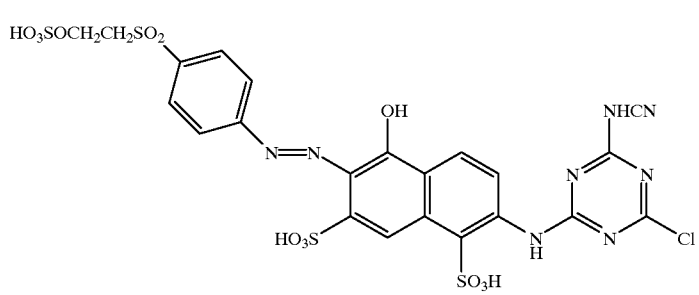

(C)

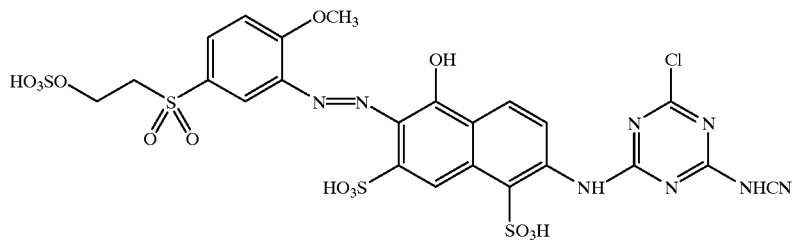
(D)

EXAMPLE 6

A dye mixture according to the invention is obtained by mixing in a mechanical mixer 150 parts of an orange electrolyte-salt containing dyestuff of formula (D) in a proportion of 50% with 50 parts of an red electrolyte-salt containing dyestuff of formula (B) in a proportion of 50%. The resulting dye mixture of the invention, when employed by the application and fixing methods customary in the art for fiber-reactive dyes, produces on cellulose fiber materials, for example dyeings and prints in deep reddish-tinged orange shades. This mixture also exhibits very good dyestuff properties.

EXAMPLE 7

A dye mixture according to the invention is obtained by mixing in a mechanical mixer 40 parts of an orange electrolyte-salt containing dyestuff of formula (D) in a proportion of 50% with 133 parts of an red electrolyte-salt containing dyestuff of formula (E) in a proportion of 60%. The resulting dye mixture of the invention, when employed by the application and fixing methods customary in the art for fiber-reactive dyes, produces on cellulose fiber materials, for example dyeings and prints in deep yellowish-tinged red shades. This mixture also exhibits very good dyestuff properties.

EXAMPLE 8

A dye mixture according to the invention is obtained by mixing in a mechanical mixer 20 parts of an orange electrolyte-salt containing dyestuff of formula (A) in a proportion of 50%, 20 parts of an orange electrolyte-salt containing dyestuff of formula (C), and with 133 parts of an red electrolyte-salt containing dyestuff of formula (E) in a proportion of 60%. The resulting dye mixture of the invention, when employed by the application and fixing methods customary in the art for fiber-reactive dyes, produces on cellulose fiber materials, for example dyeings and prints in deep yellowish-tinged red shades. This mixture also exhibits very good dyestuff properties.

EXAMPLE 9

A dye mixture according to the invention is obtained by mixing in a mechanical mixer 30 parts of an orange electrolyte-salt containing dyestuff of formula (A) in a proportion of 50%, 30 parts of an orange electrolyte-salt containing dyestuff of formula (C), and with 100 parts of an red electrolyte-salt containing dyestuff of formula (F) in a proportion of 70%. The resulting dye mixture of the invention, when employed by the application and fixing methods customary in the art for fiber-reactive dyes, produces on cellulose fiber materials, for example dyeings and prints in deep yellowish-tinged red shades. This mixture also exhibits very good dyestuff properties.

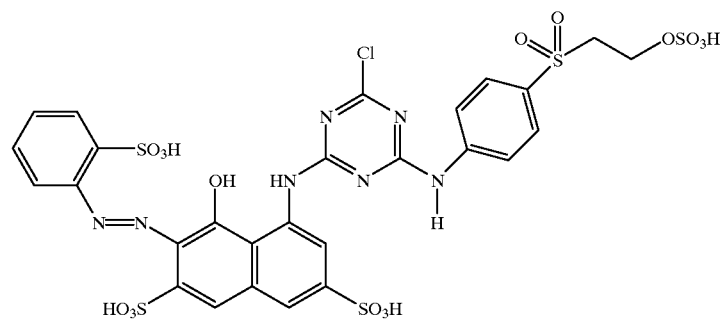
(E)

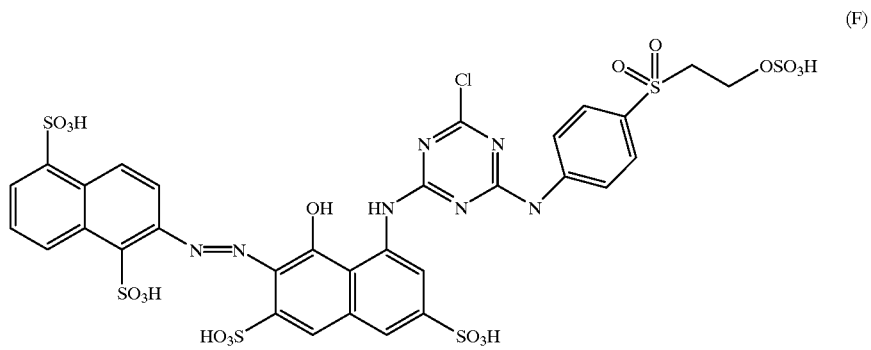

(F)

EXAMPLE 10

A dye mixture according to the invention is obtained by mixing in a mechanical mixer 30 parts of an orange electrolyte-salt containing dyestuff of formula (A) in a proportion of 50%, 30 parts of an orange electrolyte-salt containing dyestuff of formula (C), and with 133 parts of an red electrolyte-salt containing dyestuff of formula (G) in a proportion of 60%. The resulting dye mixture of the invention, when employed by the application and fixing methods customary in the art for fiber-reactive dyes, produces on cellulose fiber materials, for example dyeings and prints in deep yellowish-tinged red shades. This mixture also exhibits very good dyestuff properties.

EXAMPLE 11

A dye mixture according to the invention is obtained by mixing in a mechanical mixer 50 parts of an orange electrolyte-salt containing dyestuff of formula (D) in a proportion of 50% with 125 parts of an red electrolyte-salt containing dyestuff of formula (G) in a proportion of 60%. The resulting dye mixture of the invention, when employed by the application and fixing methods customary in the art for fiber-reactive dyes, produces on cellulose fiber materials, for example dyeings and prints in deep yellowish-tinged red shades. This mixture also exhibits very good dyestuff properties.

EXAMPLE 12

A dye mixture according to the invention is obtained by mixing in a mechanical mixer 50 parts of an orange electrolyte-salt containing dyestuff of formula (A) in a proportion of 50%, 50 parts of an orange electrolyte-salt containing dyestuff of formula (C) in a proportion of 50% and 300 parts of an red electrolyte-salt containing dyestuff of (G)

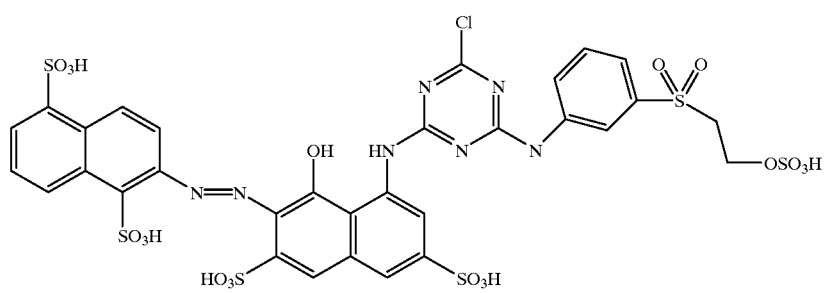

formula (H) in a proportion of 50%. The resulting dye mixture of the invention, when employed by the application and fixing methods customary in the art for fiber-reactive dyes, produces on cellulose fiber materials, for example dyeings and prints in deep yellowish-tinged red shades. This mixture also exhibits very good dyestuff properties.

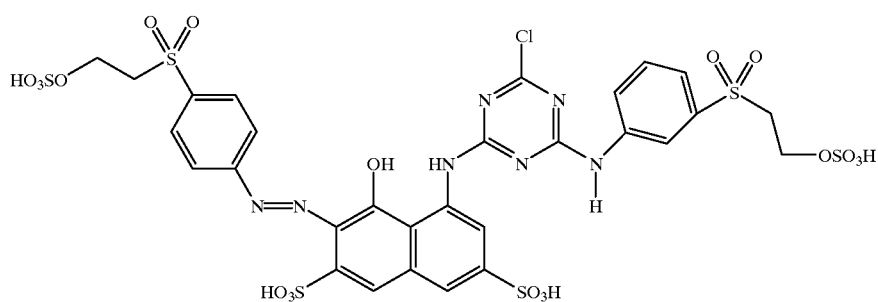

(H)

EXAMPLE 13

A dye mixture according to the invention is obtained by mixing in a mechanical mixer 150 parts of an orange electrolyte-salt containing dyestuff of formula (A) in a proportion of 50%, 150 parts of an orange electrolyte-salt containing dyestuff of formula (C) in a proportion of 50% and 100 parts of an red electrolyte-salt containing dyestuff of formula (H) in a proportion of 50%. The resulting dye mixture of the invention, when employed by the application and fixing methods customary in the art for fiber-reactive dyes, produces on cellulose fiber materials, for example dyeings and prints in deep reddish-tinged orange shades. This mixture also exhibits very good dyestuff properties.

EXAMPLE 14

A dye mixture according to the invention is obtained by mixing in a mechanical mixer 300 parts of an orange electrolyte-salt containing dyestuff of formula (D) in a proportion of 50% with 100 parts of an red electrolyte-salt containing dyestuff of formula (H) in a proportion of 50%. The resulting dye mixture of the invention, when employed by the application and fixing methods customary in the art for fiber-reactive dyes, produces on cellulose fiber materials, for example dyeings and prints in deep reddish-tinged orange shades. This mixture also exhibits very good dyestuff properties.

EXAMPLE 15

A dye mixture according to the invention is obtained by mixing in a mechanical mixer 100 parts of an orange electrolyte-salt containing dyestuff of formula (D) in a proportion of 50% with 300 parts of an red electrolyte-salt containing dyestuff of formula (H) in a proportion of 50%. The resulting dye mixture of the invention, when employed by the application and fixing methods customary in the art for fiber-reactive dyes, produces on cellulose fiber materials, for example dyeings and prints in deep yellowish-tinged red shades. This mixture also exhibits very good dyestuff properties.

EXAMPLES 16 TO 25

Further dye mixtures according to the invention of monoazo dyestuffs conforming to the general formulae (I) (II), and (III)

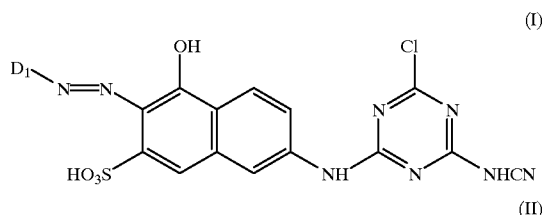

(I)

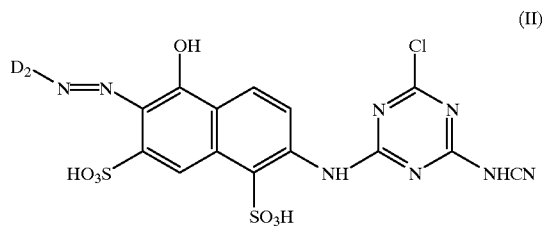

(II)

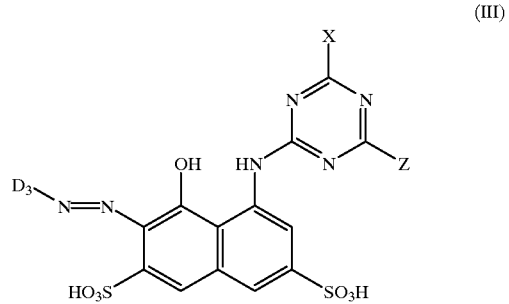

(III)

are described with the aid of their components in the following Tabular Examples. They can be prepared in the manner according to the invention either by mechanical mixing of the individual dyestuffs or else by a chemical route, for example analogously to one of the above Embodiment Examples. The numerical ratios stated in the column WR indicate the weight ratio in percent of the dyestuff or dyestuffs of the formula (I) to the dye stuff or dyestuffs of the formula (II) or dyestuffs of the formula (III) in which the dyestuffs are present in the particular dye mixture.

EXAMPLES 16–25

| Ex. | D$_1$ | D$_2$ | D$_3$ | X | Z | WR (I:II:III) |
|---|---|---|---|---|---|---|
| 16 | 2-methoxy-4-(β-sulfato-ethylsulfonyl)-5-methyl-phenyl | 2-methoxy-4-(β-sulfato-ethylsulfonyl)-5-methyl-phenyl | 2-sulfophenyl | Cl | 4-(β-sulfatoethyl-sulfonyl)phenyl-amino | 15:15:70 |
| 17 | 2-methoxy-4-(β-sulfato-ethylsulfonyl)-5-methyl-phenyl | 2-methoxy-4-(β-sulfato-ethylsulfonyl)-5-methyl-phenyl | 4-(β-sulfatoethyl-sulfonyl)phenyl | Cl | 3-sulfophenyl-amino | 15:15:70 |
| 18 | 4-(β-sulfatoethyl-sulfonyl)phenyl | 4-(β-sulfatoethyl-sulfonyl)phenyl | 2-sulfonaphthyl- | F | Morpholino | 12.5:12.5:75 |
| 19 | 2-methoxy-5-(β-sulfato-ethylsulfonyl)phenyl | 2-methoxy-5-(β-sulfato-ethylsulfonyl)phenyl | 2-sulfonaphthyl- | F | Morpholino | 12.5:12.5:75 |
| 20 | 3-(β-sulfatoethyl-sulfonyl)phenyl | 3-(β-sulfatoethyl-sulfonyl)phenyl | 4-(β-sulfatoethyl-sulfonyl)phenyl | Cl | 3-sulfophenyl-amino | 15:15:70 |
| 21 | 4-(β-sulfatoethyl-sulfonyl)phenyl | 2-methoxy-5-(β-sulfato-ethylsulfonyl)phenyl | 4-(β-sulfatoethyl-sulfonyl)phenyl | Cl | 3-sulfophenyl-amino | 5:20:75 |
| 22 | 2-methoxy-4-(β-sulfato-ethylsulfonyl)-5-methyl-phenyl | 2-methoxy-4-(β-sulfato-ethylsulfonyl)-5-methyl-phenyl | 2-sulfo-4-methyl-phenyl | Cl | 4-(β-sulfatoethyl-sulfonyl)phenyl-amino | 15:15:70 |
| 23 | 2-methoxy-5-(β-sulfato-ethylsulfonyl)phenyl | 2-methoxy-5-(β-sulfato-ethylsulfonyl)phenyl | 4-(β-sulfatoethyl-sulfonyl)phenyl | F | 2-ethylphenyl-amino | 12.5:12.5:75 |
| 24 | 2-methoxy-5-(β-sulfato-ethylsulfonyl)phenyl | 2-methoxy-5-(β-sulfato-ethylsulfonyl)phenyl | 4-(β-sulfatoethyl-sulfonyl)phenyl | F | 2-sulfophenyl-amino | 12.5:12.5:75 |
| 25 | 2-methoxy-5-(β-sulfato-ethylsulfonyl)phenyl | 2-methoxy-5-(β-sulfato-ethylsulfonyl)phenyl | 4-(β-sulfatoethyl-sulfonyl)phenyl | Cl | γ-(β'-sulfatoethyl-sulfonyl)propyl-amino | 15:15:70 |

What is claimed:

1. A dye mixture comprising one or more monoazo dyestuffs corresponding to the general formula (1) and one or more monoazo dyestuffs corresponding to the general formula (2)

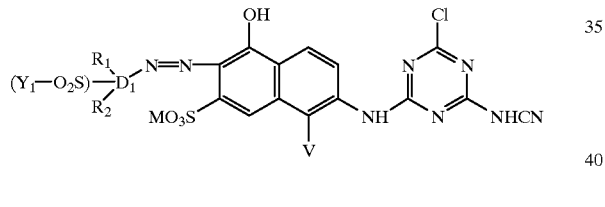

(1)

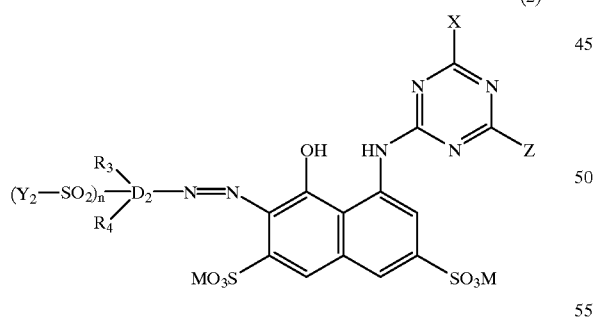

(2)

in which

D$_1$ is the radical of a benzene or naphthalene nucleus

D$_2$ has one of the meanings of D$_1$;

R$_1$ and R$_2$ are independently form one another hydrogen, methyl, ethyl, methoxy, ethoxy, sulfo or carboxy, R$_3$ and R$_4$ are independently form one another hydrogen, methyl, ethyl, methoxy, ethoxy, sulfo or carboxy, Y$_1$ is vinyl or is ethyl which is substituted in the β-position by a substituent which is eliminated by the action of an alkali, forming the vinyl group, Y$_2$ has one of the meanings of Y$_1$;

M is hydrogen or an alkali metal;

n is the number 0 or 1;

X is chloro, fluoro, hydroxy, methoxy, morpholino, N-methyltaurine, taurine, ethanolamino, diethanolamino, or a group of the formulae (3), (4), (5), or (6)

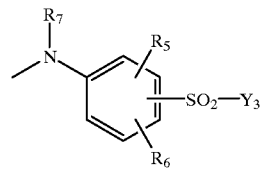

(3)

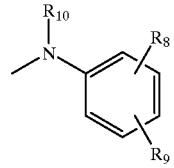

(4)

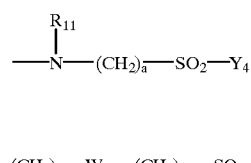

(5)

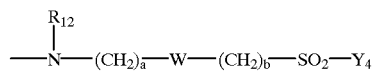

(6)

in which

R$_5$, R$_6$, R$_8$, R$_9$ are independently of one another hydrogen, methyl, ethyl, methoxy, ethoxy, sulfo or carboxy R$_{11}$ is hydrogen, methyl, ethyl, or phenyl, which may contain 1 or 2 substituents, selected from the group consisting of methyl, ethyl, methoxy, ethoxy, sulfo, carboxy groups, and a group of the formula —(CH$_2$)$_a$-SO$_2$—Y$_4$—, wherein a and Y$_5$ are described below, $R_{12}$ is hydrogen, methyl, ethyl or phenyl, which may contain 1 or 2 substituents, selected from the group consisting of methyl, ethyl, methoxy, ethoxy, sulfo, carboxy groups, and a group of the formula —$(CH_2)_a$—W—$(CH_2)_b$—$SO_2$—$Y_5$, wherein a, b and $Y_5$ are described below;

$Y_3$, $Y_4$ and $Y_5$ are independently of one another vinyl or is ethyl which is substituted in the β-position by a substituent which is eliminated by the action of an alkali, forming the vinyl group, a is the number 1, 2, or 3;

b is the number 2 or 3;

W is a group of the formulae —O— or —NH—;

V is hydrogen or a sulfo group;

Z has one of the meanings of X;

$R_7$ and $R_{10}$ are independently of one another a group of the formula —$(CH_2)_{a'}$—B B is hydrogen, sulfo or carboxy a' is the number 1, 2, 3 or 4.

2. A dyestuff mixture as claimed in claim 1, comprising one or more azo dyestuffs corresponding to the formula (1) and one or more azo dyestuffs corresponding to the formula (2) in a mixing ratio of 90:10% by weight to 10:90% by weight.

3. A dye mixture as claimed in claim 1, comprising one or more azo dyestuffs corresponding to the formula (1) and one or more azo dyestuffs corresponding to the formula (2) in a mixing ratio of 70:30% by weight to 30:70% by weight.

4. A dye mixture as claimed in claim 1, in which $D_1$ and $D_2$ are both the radical of a benzene nucleus.

5. A dye mixture as claimed in claim 4, in which $R_1$ is hydrogen, methoxy or methyl, $R_2$ is hydrogen or methoxy, $R_3$ is hydrogen, methoxy or methyl and $R_4$ is hydrogen or methoxy, and $R_5$ and $R_6$ are hydrogen and X is chlorine.

6. A dye mixture according to claim 1, wherein Y is in each instance, independently of the others, is vinyl or is ethyl substituted in the β-position by chlorine, thiosulfato, sulfato, alkanoyloxy of 2 to 5 carbon atoms, phosphato, sulfobenzoyloxy or p-toluylsulfonyloxy.

7. A dye mixture according to claim 1, wherein Y is in each instance, independently of the others, is vinyl or β-sulfatoethyl.

8. A method for the preparation of dyes mixtures according to claim 1 which comprises mechanically mixing the individual dyes in solid form or in form of aqueous solutions or by means of diazotization and coupling reactions using appropriate mixtures of the diazo and coupling components.

9. A process for dyeing hydroxy- and/or carboxamido-containing fiber material which comprises applying dye mixtures as claimed in claim 1 to the material and the dyes are fixed to the material by (1) means of heat, (2) with the aid of an alkali or (3) by means of heat and with the aid of an alkali.

10. The dye mixture as claimed in claim 1, wherein $Y_1$ is vinyl or is ethyl which is substituted in the β-position by a substituent selected from the group consisting of chlorine, thiosulfato, sulfato, alkanoyloxy of 2 to 5 carbon atoms, phosphate, sulfobenzoyloxy and p-toluylsulfonyloxy;

M is hydrogen, lithium, sodium and potassium and $Y_3$, $Y_4$ and $Y_5$ are independently of one another vinyl or is ethyl, which is substituted in the β-position by a substituent which is selected from the group consisting of chlorine, thiosulfato, sulfato, alkanoyloxy of 2 to 5 carbon atoms, phosphate, sulfobenzoyloxy and p-toluylsulfonyloxy.

11. The dyestuff as claimed in claim 2, wherein $Y_1$ is vinyl, β-chloroethyl, β-thiosulfatoethyl or β-sulfatoethyl and M is hydrogen, lithium, sodium or potassium and $Y_3$, $Y_4$ and $Y_5$ are independently of one another vinyl or is ethyl, which is substituted in the β-position by a substituent which is selected from the group consisting of chlorine, thiosulfato, sulfato, alkanoyloxy of 2 to 5 carbon atoms, phosphate, sulfobenzoyloxy and p-toluylsulfonyloxy.

12. The dye mixture as claimed in claim 3, wherein $R_1$, $R_2$, $R_3$ and $R_4$ are identical or different and are methyl, methoxy or hydrogen and $D_1$ is a benzene radical M is hydrogen, lithium, sodium or potassium.

13. The dye mixture as claimed in claim 12, wherein $R_1$, $R_2$, $R_3$ and $R_4$ are hydrogen.

14. The dye mixture as claimed in claim 1, wherein $D_1$ is a naphthalene radical;

$R_1$ and $R_2$ are independently of one another, hydrogen, sulfo or carboxy;

$R_3$ and $R_4$ are identical or different and are a hydrogen, sulfo or carboxy and M is hydrogen, lithium, sodium or potassium.

15. The dye mixture as claimed in claim 14, wherein $R_1$ and $R_2$ are identical or different and are a hydrogen or sulfato and $R_3$ and $R_4$ are identical or different and are a hydrogen or sulfo.

* * * * *

UNITED STATES PATENT AND TRADEMARK OFFICE
CERTIFICATE OF CORRECTION

PATENT NO. : 6,051,037
DATED : April 18, 2000
INVENTOR(S) : Ron Pedemonte, et al.

It is certified that error appears in the above-indentified patent and that said Letters Patent is hereby corrected as shown below:

In column 1, line 64, please delete "phosphate" and insert - - phosphato- - .

In claim 11, at line 9, (column 20, line 28), please delete "phosphate" and insert - - phosphato - -.

Signed and Sealed this

Sixth Day of March, 2001

NICHOLAS P. GODICI

*Attest:*

*Attesting Officer*     *Acting Director of the United States Patent and Trademark Office*